United States Patent [19]

Tallving

[11] Patent Number: 4,744,474
[45] Date of Patent: May 17, 1988

[54] DISPLAY STAND

[76] Inventor: Nils Tallving, Tallbackens Gård, S-605 90 Norrköping, Sweden

[21] Appl. No.: 34,152
[22] PCT Filed: Jul. 2, 1986
[86] PCT No.: PCT/SE86/00321
   § 371 Date: Feb. 13, 1987
   § 102(e) Date: Feb. 13, 1987
[87] PCT Pub. No.: WO87/00015
   PCT Pub. Date: Jan. 15, 1987

[30] Foreign Application Priority Data

Jul. 5, 1985 [SE] Sweden .............................. 8503354-6

[51] Int. Cl.⁴ ............................................... A47F 3/14
[52] U.S. Cl. ..................................... 211/133; 211/194
[58] Field of Search ............... 211/133, 132, 130, 126, 211/81, 88, 194, 149, 104; 108/108, 1; 312/120, 128

[56] References Cited

U.S. PATENT DOCUMENTS

| 291,030 | 1/1884 | Clapper | 108/1 |
| 3,330,576 | 7/1967 | Willis | 211/133 |
| 3,388,808 | 6/1968 | Radek | 211/132 |
| 3,527,360 | 9/1970 | Thielhing | 211/126 X |
| 3,616,938 | 11/1971 | McLeendn et al. | |
| 4,270,678 | 6/1981 | Drader | 211/126 X |

FOREIGN PATENT DOCUMENTS

| 0057800 | 8/1982 | European Pat. Off. | |
| 2552480 | 5/1977 | Fed. Rep. of Germany . | |
| 407511 | 4/1979 | Sweden . | |
| 390141 | 7/1965 | Switzerland | 211/126 |
| 349186 | 5/1931 | United Kingdom | 211/126 |

Primary Examiner—Robert W. Gibson, Jr.
Assistant Examiner—Sarah A. Lechok Eley
Attorney, Agent, or Firm—Jeffers, Hoffman & Niewyk

[57] ABSTRACT

The present invention relates to an arrangement for a product or display stand (1) with holders (6) arranged above one another and capable of being folded one after the other viewed from above, which holders for the purpose of their ability to be folded are in engagement in an articulated and detachable fashion on one rear side with a frame component. This comprises two vertically arranged uprights (3, 4) preferably situated at the rear corners of the holders. Each upright (3, 4) has a form such that it encloses the rear corners of the respective holder (6). Projections (7) are arranged preferably at identical mutual distances along the aforementioned uprights (3, 4). Every one of these is so arranged as to be in engagement with at least one part of a corresponding contact surface (8) on each holder (6). The contact surface (8) is bounded by a rear stop (9) and a front stop (10) acting against the aforementioned projections (7). The purpose of the rear stop (9) is to ensure that the holder (6) can be removed only once it has been lifted so that the rear stop (9) can pass over the projections (7). The front stop (10) is so arranged that, when a holder (6) is in a folded vertical position inclined against the uprights (3, 4), the front stop (10) rests against the associated projection (7) with the holder (6) suspended.

2 Claims, 4 Drawing Sheets

DISPLAY STAND

BACKGROUND OF THE INVENTION

The present invention relates to an arrangement for a product or display stand with at least two wire baskets which have upward- and outward-inclined sides and with a frame component comprising two vertically arranged uprights on which the wire baskets are so arranged as to be in engagement in an articulated and detachable fashion at their respective rear corners one above the other in such a way that they are capable of being folded one after the other from the top downwards against the uprights.

A stand of this kind is previously disclosed, for example through SE B No. 7506381-8, which presents a stand with shelves arranged one above the other. A disadvantage of this previously disclosed stand is that the shelves contained therein are not easily detachable from the uprights of the frame component, and that special locking devices are required in order to keep the shelves folded up in the vertical position. Furthermore, this stand has a frame which reduces accessibility from the front.

SUMMARY OF THE INVENTION

One object of the present invention is to make available a product or display stand of the kind referred to by way of introduction in which the wire baskets are easily capable on the one hand of being removed from the frame and on the other hand of being folded up as they become empty. This is made possible in accordance with the invention in that the front side of each wire basket is capable of being folded inwards and downwards against the bottom of the wire basket, in that each upright has a form such that it encloses the associated rear corners of the respective wire basket, and in that there are arranged preferably at identical mutual distances along the aforementioned uprights projections facing towards one another and so arranged as to be in engagement with at least one part of a corresponding contact surface on each wire basket, which contact surface is bounded by a rear stop and a front stop acting against the aforementioned projections, in conjunction with which the rear stop has as its purpose to ensure that the wire basket can be removed only once it has been lifted so that the rear stop can pass over the projection and the front stop is so arranged that, when a wire basket is in a folded, vertical position inclined against the uprights, the front stop rests against the associated projection with the wire basket suspended, and in that the aforementioned front side of the respective wire basket exhibits upward-extending locking devices arranged at its upper edge and so arranged as to be in engagement with the lower edge of the front side of the superjacent wire basket in order to prevent the front side of the superjacent wire basket from being folded inwards and downwards before that wire basket has been folded up.

In accordance with a particular characteristic feature of the invention each wire basket has at its bottom devices so arranged as to be in engagement with the upper edge or with devices arranged on the upper edge of a subjacent wire basket, which means that a number of wire baskets can be stacked one on top of the other. Since the front side of each wire basket can be folded inwards and downwards towards the bottom of the wire basket, this means that a number of wire baskets can not only be stacked one on top of the other, but can also be stacked one inside the other on condition that the folding sides have been folded down.

BRIEF DESCRIPTION OF THE DRAWINGS

The invention will now be described in greater detail below with reference to the accompanying drawing, in which.

Figure 1:
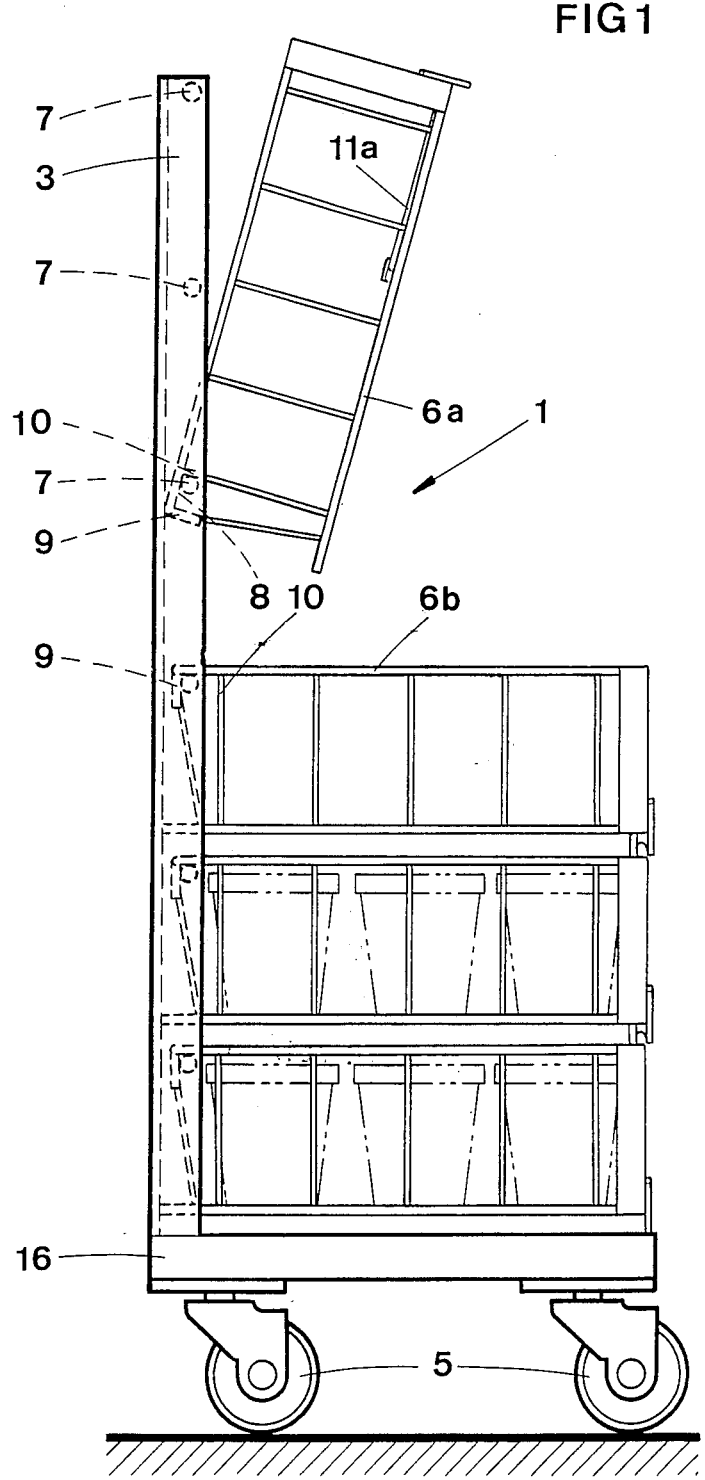
FIG. 1 shows a product or display stand in accordance with the invention in diagrammatic form.
Figure 2:
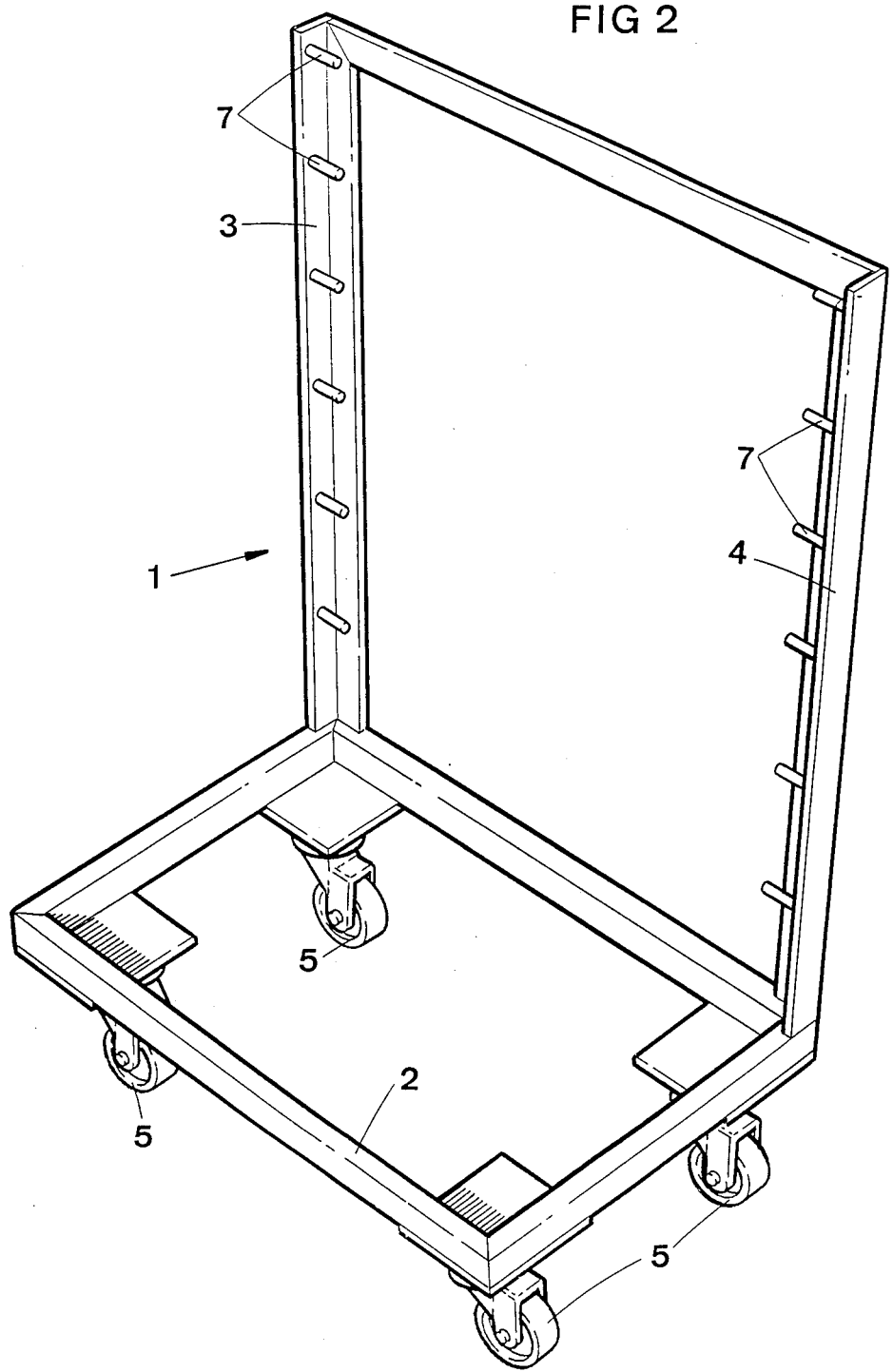
FIG. 2 shows the frame component for a product or display stand in accordance with the invention.

Although the display or product stand in accordance with the invention is described below in conjunction with the design with wire baskets illustrated in the drawing, it is clear that the stand can be equipped within the scope of the invention with other containers or with flat shelves, for instance made of wood or metal.

DESCRIPTION OF A PREFERRED EMBODIMENT

In the drawings the reference 1 is used generally to designate an illustrative embodiment of a product or display stand in accordance with the invention, comprising a frame component with two vertically arranged uprights 3, 4. The frame component can be designed to stand on a flat surface, to be hung from or mounted on a wall, or to be fitted with wheels 5, as shown in the drawing. A number of wire baskets 6 arranged one above the other and capable of being folded one after the other viewed from above and having upward- and outward-inclined sides are attached to the uprights 3, 4 in an articulated and detachable fashion.

According to the invention the uprights 3, 4 have a form such that they enclose the rear corners of the wire baskets 6, and these are provided at identical mutual distances along the uprights with projections 7, in this case of circular cross-section, which projections are so positioned that the projections on each upright face towards one another. Each of the projections 7 is so arranged as to be in engagement with at least one part of a corresponding contact surface 8 on the respective wire basket.

The contact surface 8 is bounded by a front stop and a rear stop, 9 and 10 respectively, acting against the aforementioned projection 7. The purpose of the rear stop 9 is to ensure hat the wire basket 6 can be removed only once it has been lifted so that the rear stop 9 can pass over the projection 7. This also makes it possible to lift off simultaneously a number of baskets which are positioned one above the other but which are not folded up. The front stop 10 is so arranged that, when a wire basket 6a is in a folded, vertical position inclined against the uprights 3, 4, the front stop 10 rests against the associated projection 7, with the wire basket 6a suspended from the projection.

When the wire basket 6a is in a folded, vertical position inclined against the uprights 3, 4, the subjacent wire basket 6b is exposed, making it accessible for emptying. In conjunction with the folding up of the wire basket 6a, its front side 11a is released so that it can be folded inwards and downwards against the bottom of the wire basket 6a, for the purpose of enabling it to come into close contact with a superjacent, previously folded basket.

In order to prevent the front side 11a of a wire basket 6a situated in the topmost position from being folded inwards and downwards before the basket 6a has been folded up, the immediately subjacent basket 6b exhibits on its front side 11b upward-extending locking devices 14b so arranged as to be in engagement with the lower edge of the front side 11a of the superjacent wire basket 6a.

Figure 3A:
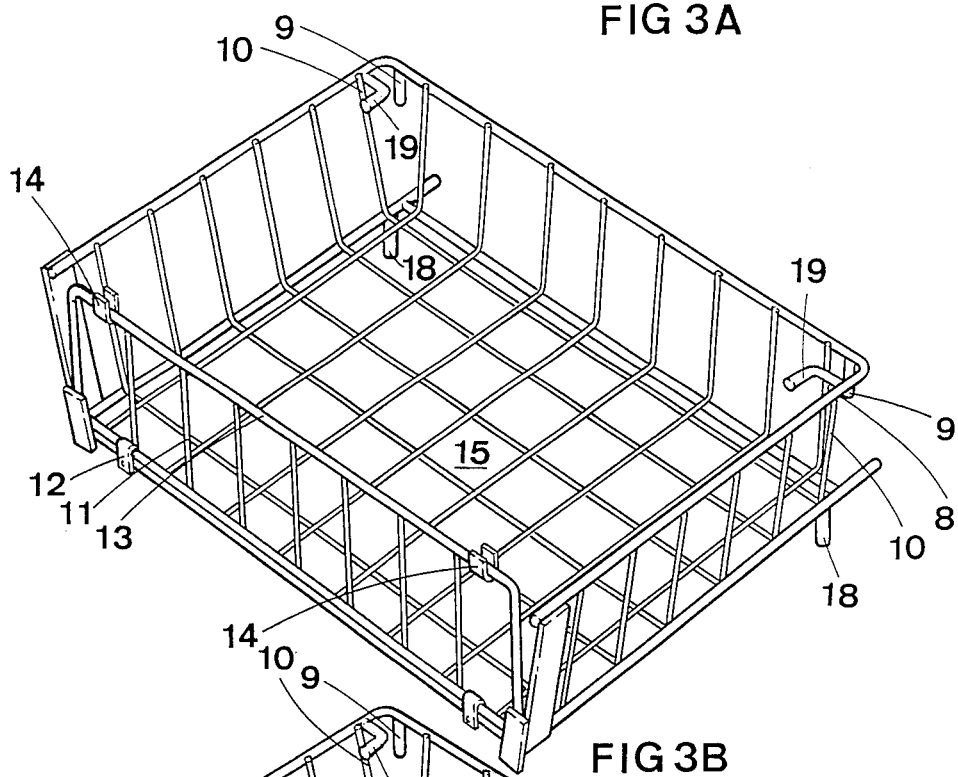
FIGS. 3a and 3b show a basket for the aforementioned stand, with its front side folded up and folded down respectively.
Figure 3B:
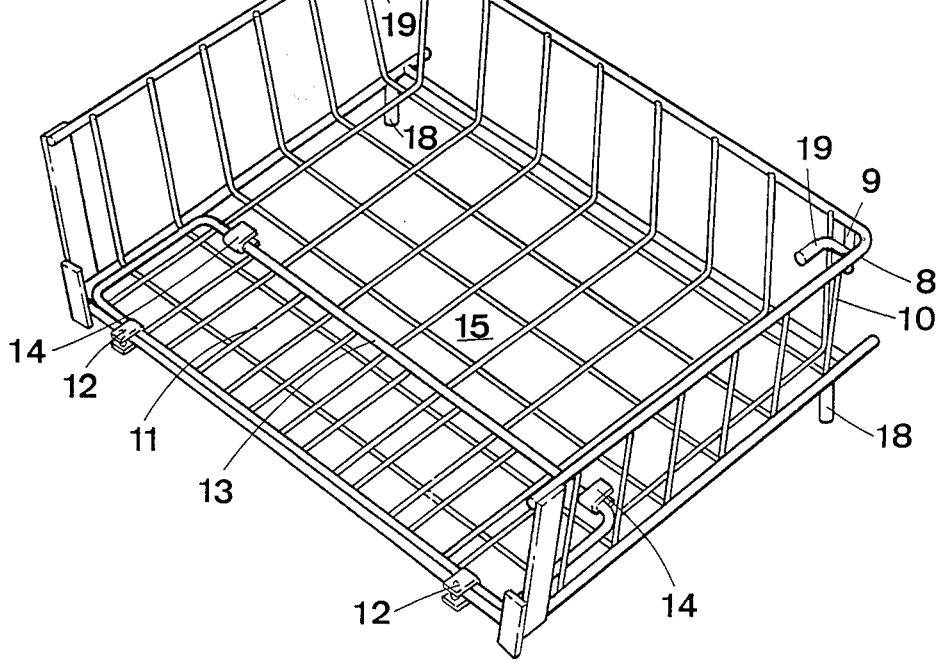
Figure 4:
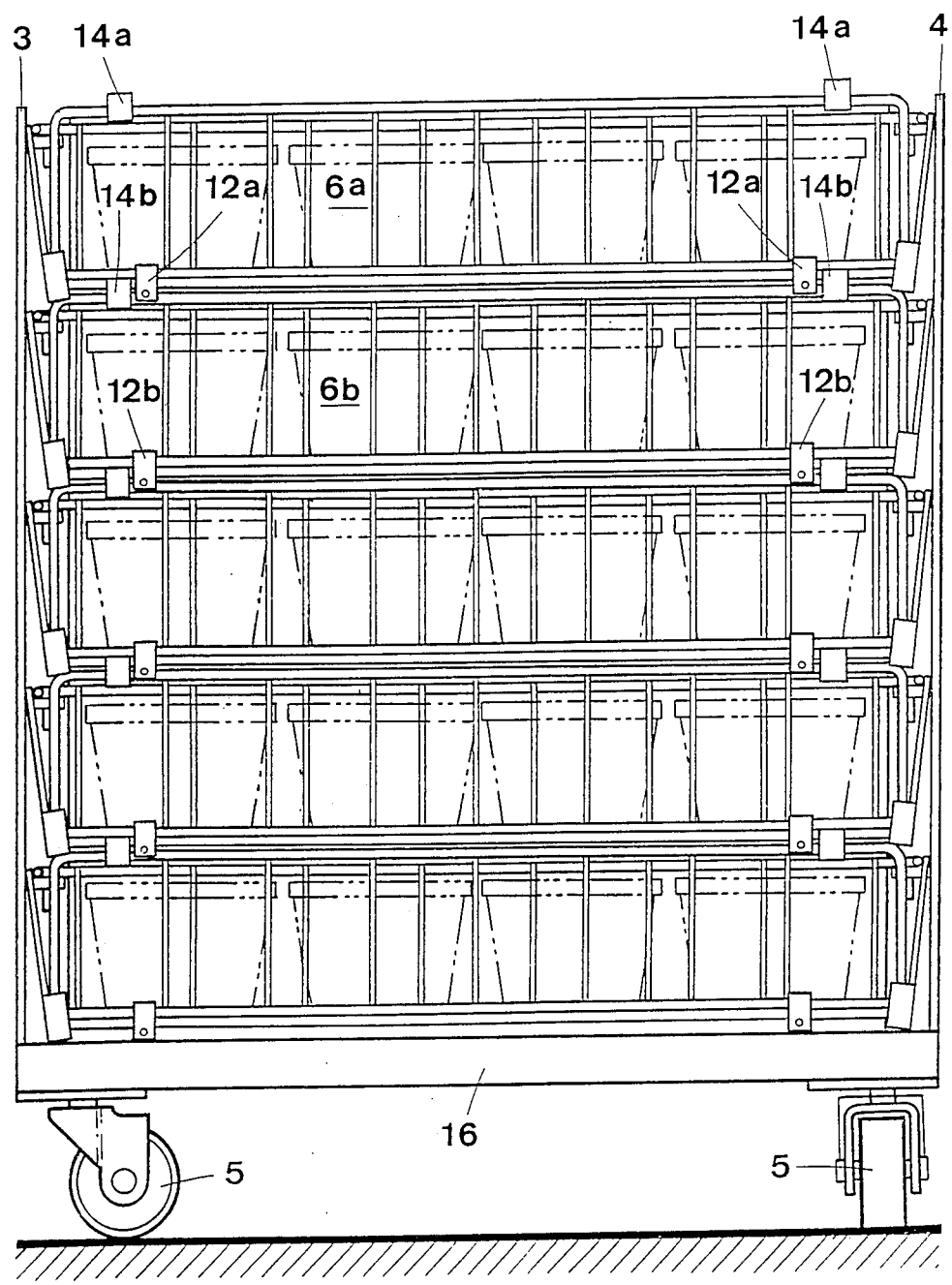
FIG. 4 shows a product stand in accordance with the invention in plan view seen from the front.

It has been stated already that the wire baskets 6 have upward- and outward-inclined sides. In order to make it possible in spite of this to stack a number of baskets 6 one on top of the other, each basket has at its bottom devices 12, 19 so arranged as to be in engagement with the upper edge of the immediately subjacent basket, or with corresponding devices 14, 19 arranged on the upper edge 13. The aforementioned devices, which may be executed in many ways, for example in the manner illustrated in FIGS. 3a and 3b, are intended to prevent empty baskets from being stacked one inside the other, which is desirable in order to save space. However, in order to permit the baskets to be stacked one inside the other, use is made of the previously disclosed ability of the front sides 11 of the baskets to be folded inwards and downwards; when the aforementioned sides are in their folded-down position, the baskets may be stacked one inside the other without being obstructed by the aforementioned devices 12, 13, 18, 19.

A product or display stand 1 in accordance with the present invention can not only be used for the display and sale of products of the most varied kinds, but can also constitute an essential part of a transport and storage system intended specifically for those products which normally have a limited shelf life and which require gentle handling so as not to be damaged during transport.

It is obvious that the invention cannot be regarded as being restricted to the above-mentioned embodiment, but may be modified in many ways within the scope of the idea of invention. The projection, which above is of circular cross-section, may instead be of rectangular cross-section, for example, and may be provided with transcurrent openings through which corresponding projections on the baskets can pass. These projections may, of course, also be removably attached to the respective shelf or basket.

I claim:

1. A product or display stand with at least two wire baskets (6) which have upward- and outward-inclined sides and with a frame component comprising two vertically arranged uprights (3, 4) on which the wire baskets are in engagement in an articulated and detachable fashion at their respective rear corners one above the other and are foldable one after the other from the top downwards against the uprights (3, 4), the front side (11a) of each wire basket (6a) is foldable inwards and downwards against the bottom of the wire basket (6a) to enable a lower basket to fit inside the superjacent basket when the baskets are folded upwardly against the uprights, in that each upright (3, 4) encloses the associated rear corners of the respective wire basket (6), and in that there are arranged preferably at identical mutual distances along the aforementioned uprights (3, 4) projections (7) facing towards one another and includes means permitting engagement with at least one part of a corresponding contact surface (8) on each wire basket (6a), which contact surface (8) is bounded by a rear stop (9) and a front stop (10) acting against the aforementioned projections (7), in conjunction with which the rear stop (9) whereby the wire basket (6) can be removed only once it has been lifted so that the rear stop (9) can pass over the projection (7) and the front stop (10) is so arranged that, when a wire basket (6a) is in a folded, vertical position inclined against the uprights (3, 4), the front stop (10) rests against the associated projection (7) with the wire basket (6a) suspended, and in that the aforementioned front side (11a) of the respective wire basket (6a) comprises upward-extending locking means (14) arranged at its upper edge for engaging a lower edge (15) of the front side (11b) of the superjacent wire basket (6a) to prevent the front side (11a) of the superjacent wire basket from being folded inwards and downwards before that wire basket (6a) has been folded up toward the uprights.

2. Arrangement according to claim 1, characterized in that each wire basket (6a) has at its bottom, devices (12a) so arranged as to be in engagement with the upper edge (13b) or with devices arranged on the upper edge of a subjacent wire basket (6b), whereby a number of wire baskets can be stacked one on top of the other.

* * * * *